United States Patent [19]
Jang et al.

[11] Patent Number: 5,200,828
[45] Date of Patent: Apr. 6, 1993

[54] AUTOFOCUSING DEVICE FOR USE IN A VIDEO CAMERA AND AN AUTOFOCUSING METHOD THEREOF

[75] Inventors: Seong I. Jang; Jae K. Chong, both of Seoul; Sung H. Lee; Min H. Song, both of Kyunggi; Ook Kim, Seoul; Dong S. Kim, Kyunggi, all of Rep. of Korea

[73] Assignee: Sam Jung Co., Ltd., Kyunggi, Rep. of Korea

[21] Appl. No.: 669,534

[22] Filed: Mar. 14, 1991

[30] Foreign Application Priority Data

Mar. 19, 1990 [KR] Rep. of Korea ............... 90-3663
Feb. 21, 1991 [KR] Rep. of Korea ............... 91-2807

[51] Int. Cl.⁵ .................. H04N 5/232; G03B 3/00; G03B 13/18
[52] U.S. Cl. ..................... 358/227; 354/400; 354/402
[58] Field of Search ............ 358/227, 909; 354/400, 354/401, 402, 403, 404, 406

[56] References Cited

U.S. PATENT DOCUMENTS

| 4,561,749 | 12/1985 | Utagawa | 354/406 |
| 4,967,280 | 10/1990 | Takuma et al. | 358/227 |
| 4,974,092 | 11/1990 | Kawamura | 358/227 |
| 4,985,777 | 1/1991 | Kawada | 358/227 |

FOREIGN PATENT DOCUMENTS 0078377 3/1990 Japan .
0252374 10/1990 Japan .

Primary Examiner—Herbert Goldstein
Assistant Examiner—Joseph V. Colaianni, Jr.

[57] ABSTRACT

A method for autofocusing a video camera, adjusting the focus by defining the focus range in which the contrast signal is extracted, generating the control clock pulse having higher frequencies than the video signal during the occurrence period of horizontal and vertical synchronizing signals corresponding to the focus range, sampling the video signals obtained in the image pickup elements by means of the control clock pulses, converting this sampled signal into digital signal, generating the digital differential signal which represents the difference between the values of one control clock pulse earlier one and current one, producing the digital weighted signal by transforming the digital differential signal by means of the nonlinear weight value, integrating the digital weighted signals for one or more fields or frames to obtain the focusing value, and moving the focusing lensd based on the focusing value to the location where the focusing value approximately reaches the maximum.

7 Claims, 9 Drawing Sheets

FIG. 10
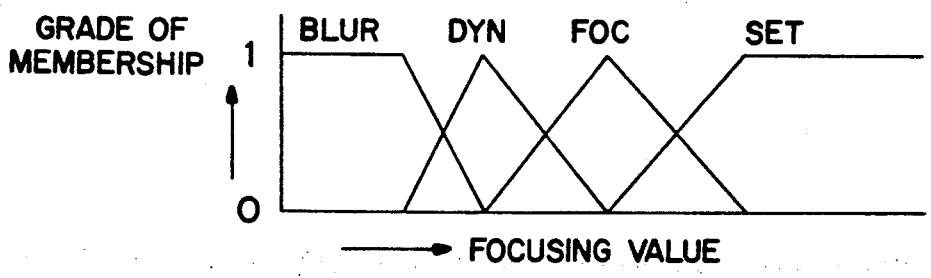
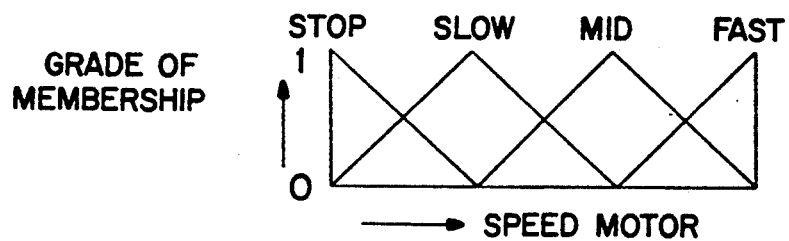
FIG. 11
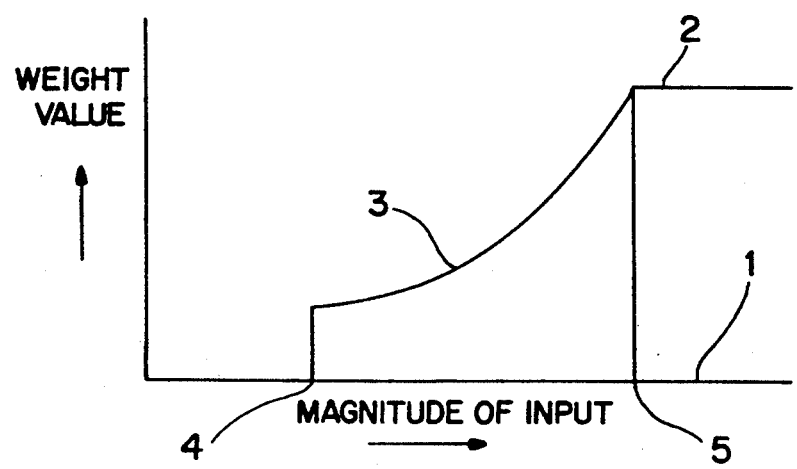

AUTOFOCUSING DEVICE FOR USE IN A VIDEO CAMERA AND AN AUTOFOCUSING METHOD THEREOF

BACKGROUND OF THE INVENTION

1. Field of the Invention

This invention relates to an autofocusing device for video cameras and more particularly, to an autofocusing method of a passive type which allows autofocusing even though an object is blurred or located in a dark place.

2. Description of the Prior Art

Generally, there are two types of autofocusing devices in the art. One is an active type, in which an infrared or ultrasonic emitter and receiver are mounted on a video camera, the distance between the camera and object is measured by means of infrared rays or ultrasonic waves emitted, reflected and received, and autofocusing is accomplished by driving a focusing lens motor based on the measured distance. The other is a passive type, in which a focusing lens is adjusted to the position of the maximum contrast by utilizing a contrast signal extracted from an image output signal obtained by an image pick-up element.

The passive type, unlike the active type, consumes little power since it does not need to emit the infrared rays or ultrasonic waves of sufficient strength, has no parallax error by analyzing and processing the image output signal, accomplishes accurate autofocusing when the objects are far apart from the camera, when the objects are slanted or inclined, and when the objects are located outside of windows, has a compact size since it does not need any external units such as infrared or ultrasonic emitters and receivers when compared with the active type.

Thus, since the passive type has the advantages as described above, it is more popular recently. The passive typed autofocusing technologies are disclosed in Japanese patent Laid-Open No. 88-59274 entitled "autofocusing device", Japanese patent Laid-Open No. 88-59275 entitled "autofocusing device", Japanese patent Laid-Open No. 87-112112 entitled "autofocusing device", Japanese patent Laid-Open No. 88-20973 entitled "autofocusing device", and Sanyo Technical Review VOL. 17 NO. 2, August 1985. One of a conventional passive typed autofocusing device is schematically illustrated in FIG. 1. As shown in FIG. 1, signals obtained from the video signals(Y signal) which lie only within focus range are applied to a band-pass filter, an output signal of which is then applied to a detecting circuit which produces a direct output signal, which is proportional to a contrast and DC level is converted to a digital signal by an analog-to-digital convertor (AD converter). The digital signal which is proportional to the contrast is integrated for one frame by a digital integrating circuit, the output of which is applied to a focusing circuit as a focusing control signal. The focusing circuit controls a focusing lens driving motor until the maximum contrast is obtained thereby adjusting the focus. However, in such a passive type video camera, since the difference between the contrast when in focus and the one when not in focus is slight when the contrast of blurred object is low or when the object is located in a dark place, it is sometimes difficult to adjust the focus and to shoot the objects. Furthermore, there is a possibility of driving of the lens motor in the wrong direction because, in addition to an original signal, the high frequency components arising from quantizing noise or external noise also function as high frequency contrast components. Such problems can not be solved by the conventional passive type device and method.

SUMMARY OF THE INVENTION

Accordingly, it is an object of the present invention to provide an autofocusing device for use in a video camera and an autofocusing method thereof.

Another object of the present invention is to provide an improved autofocusing method to solve problems of the prior art, such that a video signal is sampled by clock pulses having higher frequencies than that of the video signal, and converted to a digital signal, a differential signal is extracted from the digital signal per one clock pulse period, a weighted signal which represent the contrast better is obtained by non-linear weighting of the differential signal with using a ROM where the non-linear weighting function is incorporated the weighted signals are integrated for several fields or frames to obtain a focusing value.

A microcomputer automatically adjusts the focus by controlling the movement of the focusing lens based on the focusing value until the contrast is to be maximum value.

A further object of the present invention is to provide a autofocusing method of the video camera comprising extracting video signals within a predetermine range from the video signals produced by image pick-up elements, converting them to the digital signals, integrating the digital signals to obtain a focus control signal, and moving the focusing lens in the direction of producing largest contrast based on the focus control value to obtain optimal focus, which comprises the steps of (a) defining the focus range where the video signals are extracted and generating control clock pulses with higher frequencies than that of the video signals during the period for which the horizontal and vertical synchronizing signals corresponding to the focus range exist, (b) sampling the video signals from the image pick-up element with the control clock pulses and converting these sampled signals to digital signals, (c) generating digital differential signals which represent differences between the current value of the digital signal and the value of the previous control clock pulse interval, (d) generating digital weighted signals transformed by means of nonlinear weight value curve to make the digital differential signals sensitive to contrast, (e) integrating the digital weighted signals for at least one field or frame to obtain the focusing value, (f) moving the focusing lens for adjusting the focus based on the focusing value, (g) stopping the focusing lens motor at the location where focusing value reaches approximate maximum value.

Still another object of the present invention is to provide the autofocusing device including a control circuit for autofocusing a video camera, which extracts video signals within a predetermined focus range in image pick-up element of the video camera, converts the video signal into a digital signal, integrates the digital signal to produce a focusing value, and moves a focusing lens in the direction of increasing the contrast so that an optimal focus may be obtained by use of the focusing value, the control circuits comprises (a) means for providing a control clock pulses to circuits which processes digital signals, which includes a horizontal and vertical synchronizing signal generating circuits, a clock signal generating circuit, and a focus range control circuit and generates the control clock pulses having predetermined clock pulse period while the vertical and horizontal synchronizing signals exist according to a focus range signal which indicates the beginning and end of predetermined focus range, (b) and A/D converter connected to a low-pass filter which filters the video signals, which converts the video signals passed by the low-pass filter into a parallel digital signals of a plurality of bits according to the control clock pulses, (c) a digital contrast detector connected to said A/D converter, which generates a digital differential signal which represents differences between each said parallel sigital signals arriving at each control clock period from the A/D converter, (d) a weighting circuit connected to the digital filter, which generates a digital weighted signal using a device such as ROM, PLA, ETC, as the implementation of the weighting function, where the weighting function values are predetermined pursuant to the magnitude of the digital signal, (e) a digital integrator connected to the weighting circuit, which produces the focusing value by adding the digital weighted signals cumulatively for at least one or more fields or frames, (f) a microcomputer connected to the digital integrator via a data bus to receive the focusing value, which controls the overall control circuit to autofocus by carrying out the predetermined operations based on the focusing value, (g) a motor control circuit connected between the microcomputer and the focusing lens motor, which controls the focusing lens motor according to a motor control signals from the microcomputer.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description. Briefly the present invention relates to a method for autofocusing a video camera, comprises adjusting the focus by defining the focus range in which the video signal is extracted, generating the control clock pulse having higher frequencies than the video signal during the occurrence period of horizontal and vertical synchronizing signals corresponding to the focus range, sampling the video signals obtained in the image pick-up elements by means of the control clock pulses, converting this sampled signal into digital signal, generating the digital differential signal which represents the difference between the value of one earlier control clock pulse one current one, producing the digital weighted signal by transforming the digital differential signal by means of the nonlinear weight value, integrating the digital weighted signals for one or more fields or frames to obtain the focusing value, and moving the focusing lens based on the focusing value to the location where the focusing value approximately reaches the maximum.

BRIEF DESCRIPTION OF THE DRAWINGS

The present invention will become more fully understood from the detailed description givent hereinbelow and the accompanying drawings which are given by way of illustration only, and thus are not limitative of the present invention, and wherein:

FIG. 10 is a diagram for explaining fuzzy variables with respect to motor speeds and focusing values selected in the present invention, and FIG. 11 is a diagram showing the nonlinear weight value curves.

DETAILED DESCRIPTION OF THE INVENTION

Figure 1:
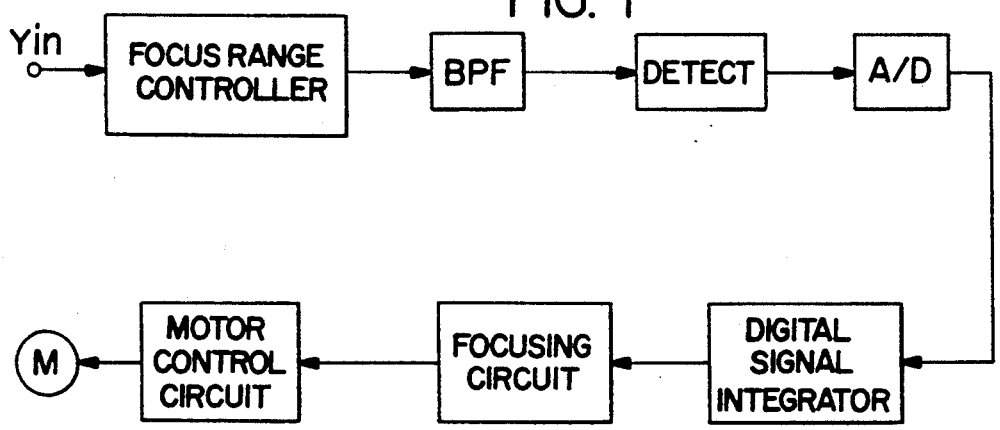
FIG. 1 diagrammatically illustrates a conventional autofocusing method.
Figure 2:
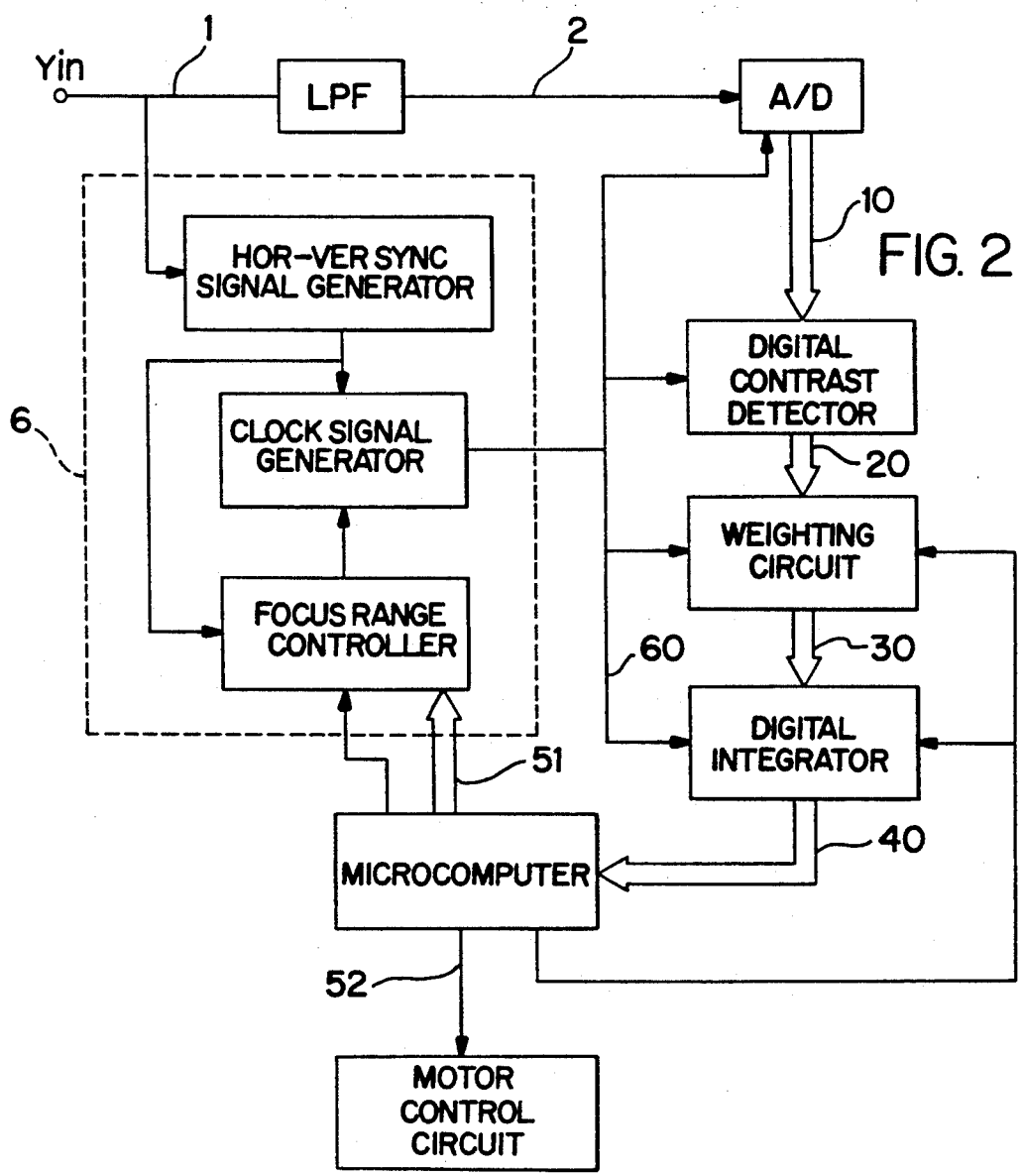
FIG. 2 is a schematic block diagram illustrating the autofocusing circuits of the present invention.

FIG. 2 is a schematic block diagram illustrating the circuits of the present invention.

The video signals (Y signals) 1 from image pick-up elements of video cameras are applied to a low-pass filter to obtain signals 2 without unnecessary high frequency components, which are applied to an A/D converter.

The A/D samples the analog signals and converts them into parallel digital signals consisting of a plurality of bits. Then digital signals 10 are applied to the digital contract detector which generates digital differential signals taken as differences between the digital signal values of current control clock pulse and the one of previous control clock pulse. Digital differential signals 20 are applied to a weighting circuit which functions to weight the signals of smaller magnitude by smaller weight value and the signals of larger magnitude with larger weight value to emphasize the contrast according to the absolute magnitude of digital differential signals. Digital weighted signals 30 which are produced by the weighting circuit to give more emphasis to the signals of bigger contrast are applied to a digital integrator. The digital integrator adds the successive digital weighted signals 30 cumulatively for a definite period which is inputted by control clock. The digital weighted signals 30 which are added together by the digital integrator for one field are sent to microcomputer in which they are averaged over a number of fields to be used as a focusing value.

The means for providing control clock pulses comprises a vertical and horizontal synchronizing signal generator, a focus range controller, and a clock signal generator. The vertical and horizontal synchronizing signal generator may either extract vertical and horizontal synchronizing signals contained in the video signal or generate synchronizing signals of video signals, i.e. it produces horizontal synchronizing signals and vertical synchronizing signals. The focus range controller generates a signal representing a beginning and end of one scanning line in the focus range between successive horizontal synchronizing pulses, and also generates the beginning and end signals designating the first and last scanning lines respectively in the focus range between successive vertical synchronizing pulses according to the data defined by the microcomputer. The clock signal generator, having a oscillator which oscillates at higher frequencies than video signals, generates and supplies necessary clock signals to each circuit which processes the digital signal based on the horizontal synchronizing signal and beginning and end signals of focus range. The means for providing the control clock pulses 6 provides appropriate control clock pulse corresponding to focus range in the video synchronizing signal system.

The microcomputer includes a CPU section, an internal clock, memories, a data bus, an input/output (I/O)-port, and terminals for various control signals. The microcomputer determines the size of focus range, determines the weight value of the weighting circuit, secures statistical values for the focusing values, receives the focusing values 40, and determines a speed and direction of rotation of a focusing lens motor to provide control signals to the motor controller and adjusts the focus. When the focusing lens moves by driving the focusing lens motor, the focusing value is changed. The microcomputer provides accurate autofocusing functions based on the changes of the focusing value.

In accordance with the preferred embodiment of the present invention, the operations of each circuit and the functions executed by the microcomputer will be explained hereunder in more detail.

Figure 3:
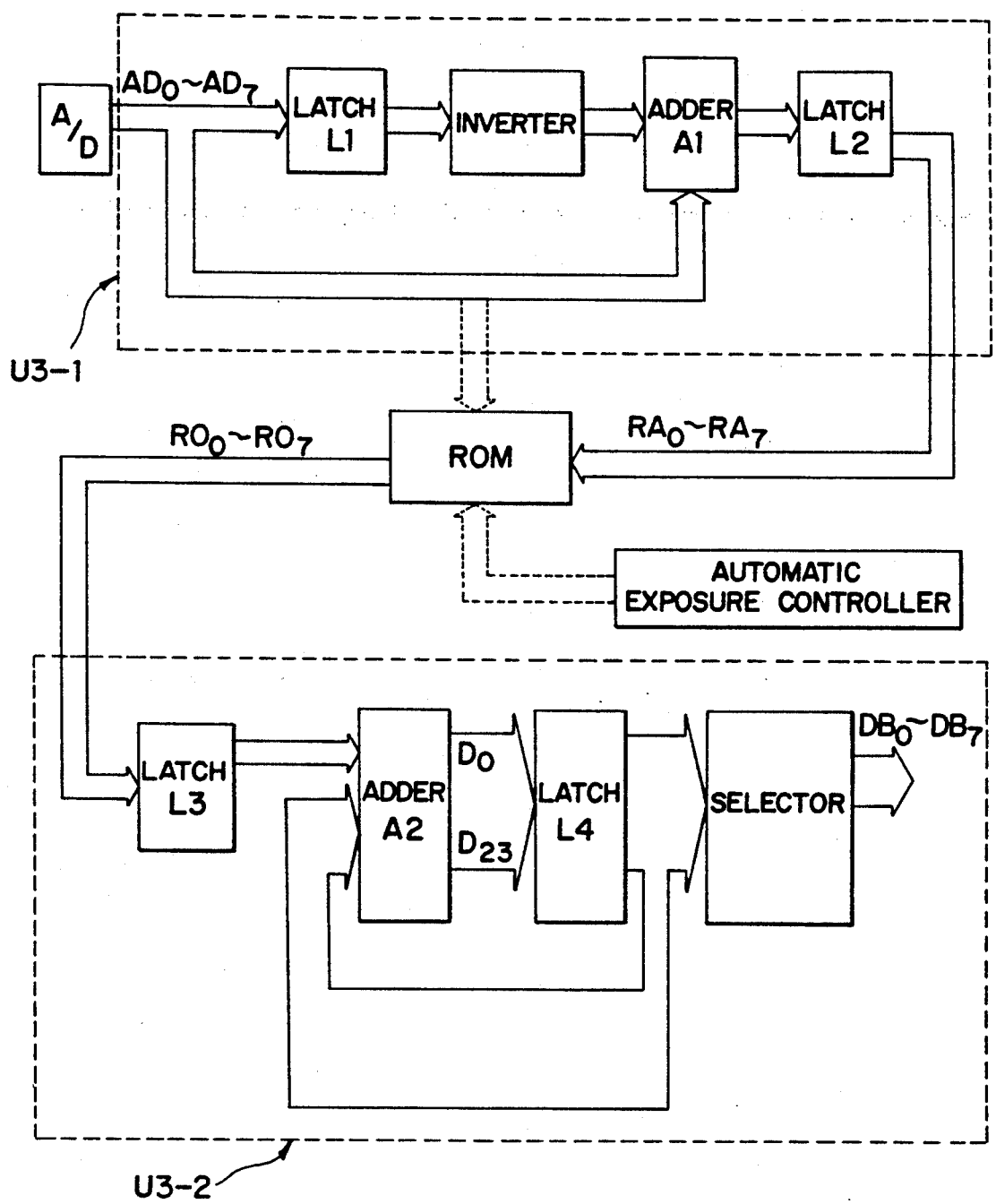
FIG. 3 is a block diagram illustrating major circuits for processing digital signals in the autofocusing circuits of the present invention.

FIG. 3 shows the organizations of the digital contract detector, a weighting circuit, and a digital integrator. The A/D converter converts the video signals to the parallel digital signals of 8 bits, i.e. 1 byte in the present embodiment. The digital filter comprises two latches, an inverter, and an adder A1. The parallel digital signals from the A/D converter are applied to the inputs of adder A1 and latch L1 respectively. The parallel digital signals latched in latch L1 are applied to the adder 1 via the inverter when the next parallel digital signals are received. The adder A1 subtracts the value of previous parallel digital signal from the value of current parallel digital signal as a result. Therefore, differential signals are generated and latched in the latch L2.

Although the weighting circuit is constructed in several ways, the Read Only Memory (ROM) is adopted in the present embodiment. The address lines of ROM are connected to the output of the digital filter, i.e., the outputs of latch L2, and the data lines of ROM are connected to the inputs of the digital integrator. Therefore, the magnitude of the digital differential signals serve as addresses, and the data stored in the corresponding addresses are outputted. In this way, the various shapes of weight value curves can be produced depending on the data stored in ROM. In the present embodiment as shown in FIG. 11, the weight value for the focusing value which is below the lower limit value 4 is made equal to zero to emphasize the contrast and to disregard its contribution to the focusing value, a slope 3 is selected so that the weight value becomes bigger as the digital differential signal goes larger, and the focusing value is also neglected and made to equal to zero 1 when it becomes larger than a upper limit value 5. However, the nonlinear weight value curve can be modified according to the grade of focusing value, and the slope 3, the lower limit value 4, and the upper limit value 5 in FIG. 11 can also be changed accordingly. The weight value above the upper limit value can be given zero value 1 or particular constant value 2 other than zero.

The reasons for making the nonlinear weighting curve is as follows. The digital differential signal which is too small can be a noise in most cases and must be prevented from being amplified. The digital differential signal becoming too large, i.e, a contrast becoming large abruptly, is generally due to a light source and increases the focusing value irrelevant to high frequency components representing the contrast, such signals must be neglected.

Some types of nonlinear weight value curves are stored in the ROM, and one of them is selected by the microcomputer to provide the most appropriate weight value according to the kinds of objects and the conditions of illumination.

In another way, the weighted signal can be generated to suit various types of objects by adjusting the weight value according to the absolute magnitude of current video signal or the brightness signal from the automatic exposure controller, as well as the digital differential signal, which is indicated by dotted arrows in FIG. 3. The lines over which the parallel digital signals from the A/D converter are directly applied to the ROM are installed, and the lines over which the brightness signals for the current picture from the automatic exposure controller are applied to the ROM are also installed. Since the video signals which are too big or too small are not likely to pertain to the pixels associated with the objects of which the shooter intends to take picture, the nonlinear weight value curves are changed by means of magnitudes of the video signals to eliminate digital differential signals produced by such pixels or to reduce its effects by multiplying by small weight values. If the digital differential signals from such pixels are utilized to adjust the focus, it may occur that the focus is adjusted for a different object, for example, for a frame of window instead of the person behind it. The nonlinear weight value curves are changed by means of the signals of picture brightness from the automatic exposure controller to adjust the focus regardless of the magnitude of illumination by normalizing the digital differential signals. In the present embodiment, together with the process of weighting the digital differential signal, the changes of the nonlinear weight value curve are made concurrently by means of the magnitude of current video signal and the signal of picture brightness. This function is accomplished by applying the current video signal and the signal of picture brightness from the automatic exposure controller together with the digital differential signal. In the present embodiment, the ROM in the weighting circuit can be replaced by a Programmable Logic Array (PLA).

The digital integrator comprises two latches L3 and L4, an adder A2 and a selector. The digital weighted signal from the ROM is latched in the latch L3 and then applied to the adder A2, the output of the adder A2 latched in the latch L4 is added to the inputs from latch L3 in the adder, and the output from the adder A2 is again latched in latch L4. Since the adder A2 adds the successive digital weighted signals cumulatively for a predetermined period, it is designed to produce the result up to 3 bytes. Therefore, the lines from the adder A2 to the latch L4 and the lines from the latch A4 to the selector are 24 lines to accommodate the 3 bytes. The data on the 24 lines are stored in 3 registers in the selector and transferred one byte at a time on the 8 output lines according to the control of the microcomputer. Namely, the microcomputer receives a 24-bit digital integrated signal, 8 bits at a time. The digital weighted signals from the ROM are integrated for at least one field or frame in the digital integrator, and the integrated signals represent the contrast and sent to the microcomputer as a focusing value which is an appropriate signal to be used in autofocusing.

Figure 4:
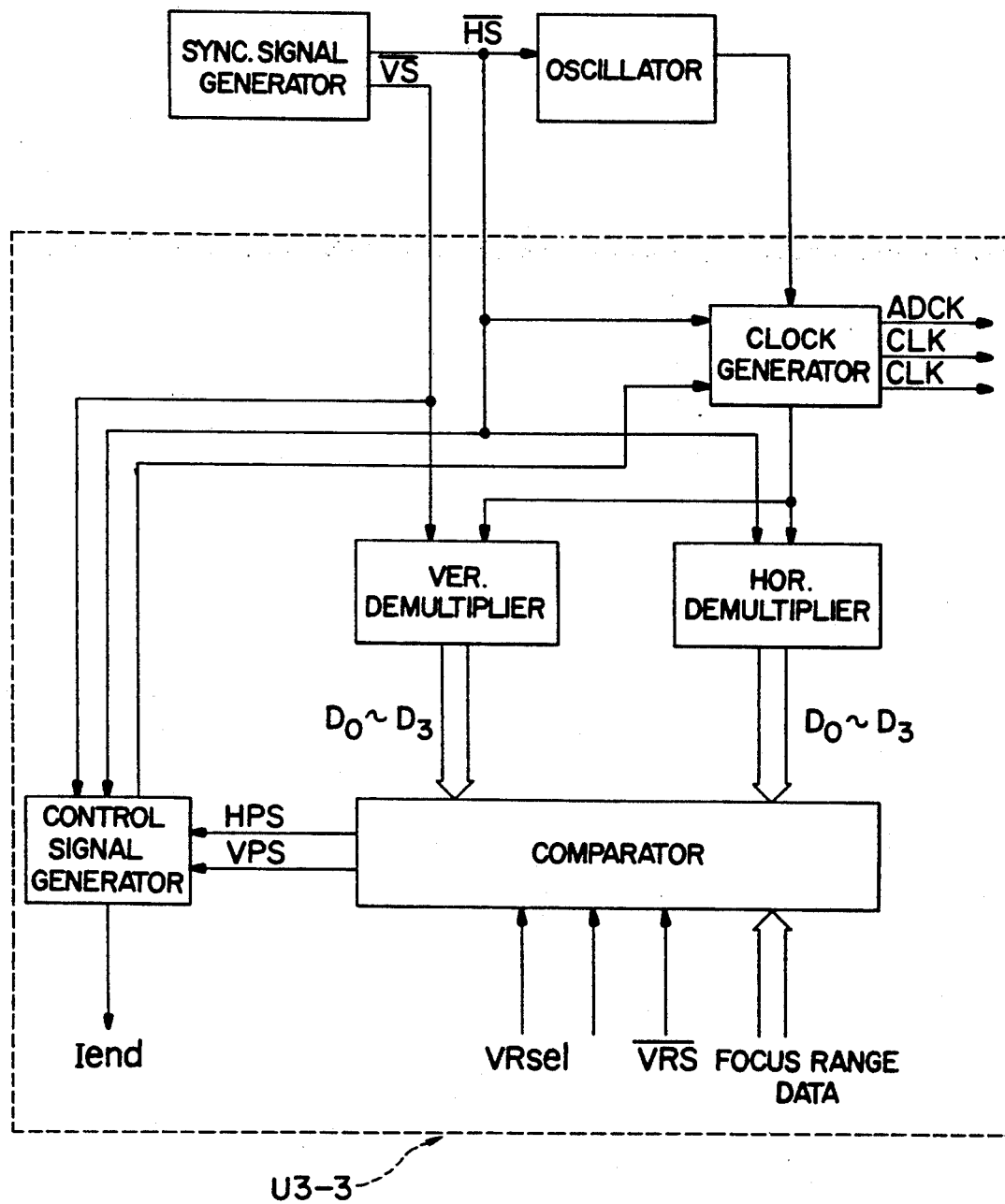
FIG. 4 is a block diagram illustrating a means for providing control clock pulses to be used in the autofocusing circuits of the present invention.

FIG. 4 shows the organization of means for providing a control clock pulse in block diagram. The means for providing control clock pulses to the circuits which process the digital signals, includes a horizontal and vertical synchronizing signal generator, a clock signal generator and a focus range controller which generates the control clock pulses having predetermined period in synchronization with vertical and horizontal synchronizing signals according to the focus range signal which indicates the beginning and end of predetermined focus range. Referring to FIG. 4, the operations of these circuits may be easily understood. The means for providing control clock pulses comprises a synchronizing signal generator, an oscillator, a clock generator, a vertical demultiplier, a horizontal demultiplier, a control signal generator, and a comparator. The synchronizing signal generator extracts the vertical and horizontal synchronizing signals VS and HS contained in the video signals, or generates the synchronizing signals to be used for the whole camera system. When the horizontal and vertical synchronizing signals HS and VS which are used in the means for providing a control clock pulse are available from other existing circuits, the synchronizing signal generator may be omitted. The oscillator oscillates at the frequencies higher than the frequencies of video signals, for example, 8 MHz in synchronization with the horizontal synchronizing signals. The clock generator produces the necessary clock pulses by manipulating the oscillating signals from the oscillator.

The horizontal demultiplier contains a counter, which divides one period of the horizontal synchronizing signal HS into n equal parts (wherein n is an integer), and outputs it in digital signals. In the present embodiment, the horizontal period is divided in 16 equal parts and outputs it in 4-bit digital signals. The vertical demultiplier also contains a counter which counts the clock pulses, divides the period of vertical synchronizing signal VS into 16 equal parts, and outputs it in 4-bit digital signals.

The comparator includes 2 comparators for comparing the vertical and horizontal synchronizing signals, respectively. The comparator receives from the microcomputer the information about the focus range, i.e. the data of beginning and end points in scanning line of the interval to be sampled, compares the data with the digital signals from the horizontal demultiplier and outputs the horizontal position coincidence signal (HPS) when they coincide with each other. The comparator also receives from the microcomputer the signal with respect to the position of scanning lines to be selected as focus range during the period of vertical synchronizing signal, and outputs the vertical position coincidence signal VPS while the scanning lines in the interval between the beginning point and the end point are appearing. Since the information of the beginning and end points of the focus range are designated by the microcomputer, the appropriate range can be taken according to the conditions of the objects and illumination.

The control signal generator receives the signals HS, VS, HPS, and VPS, produces signals for controlling the clock generator for signal timing, and provides Iend signal to the microcomputer when one field ends. It also provides the signal for the focus range for displaying to the viewfinder (not shown).

The video image forms one frame consisting of 2 fields, each field interlaced with each other, and the focusing values obtained for the two interlacing fields may not be taken for comparison since the positions of pixels in the two fields are different. Therefore, in order to take the pixels located at the same positions to produce the focusing value, the even field of each frame unit or a whole frame is utilized, or the average value for several frames or fields is utilized. It is desirable to utilize only either odd or even fields for correct autofocusing, and it is desirable to utilize both fields for fast autofocusing.

The microcomputer includes the Central Processing Unit (CPU), ROM, and the Random Access Memory (RAM), a microprocessor with controllable ports. A software to be incorporated there is written into the ROM and user's data are stored in the RAM. According to the software the microcomputer reads the focusing value via the system bus, determines the current focus level by comparing the focusing values, drives the focusing lens motor in the direction of the correct focus being found. It also carries out various functions such as the determination of the focus range, the selection of nonlinear weight value curve, etc.

Figure 5:
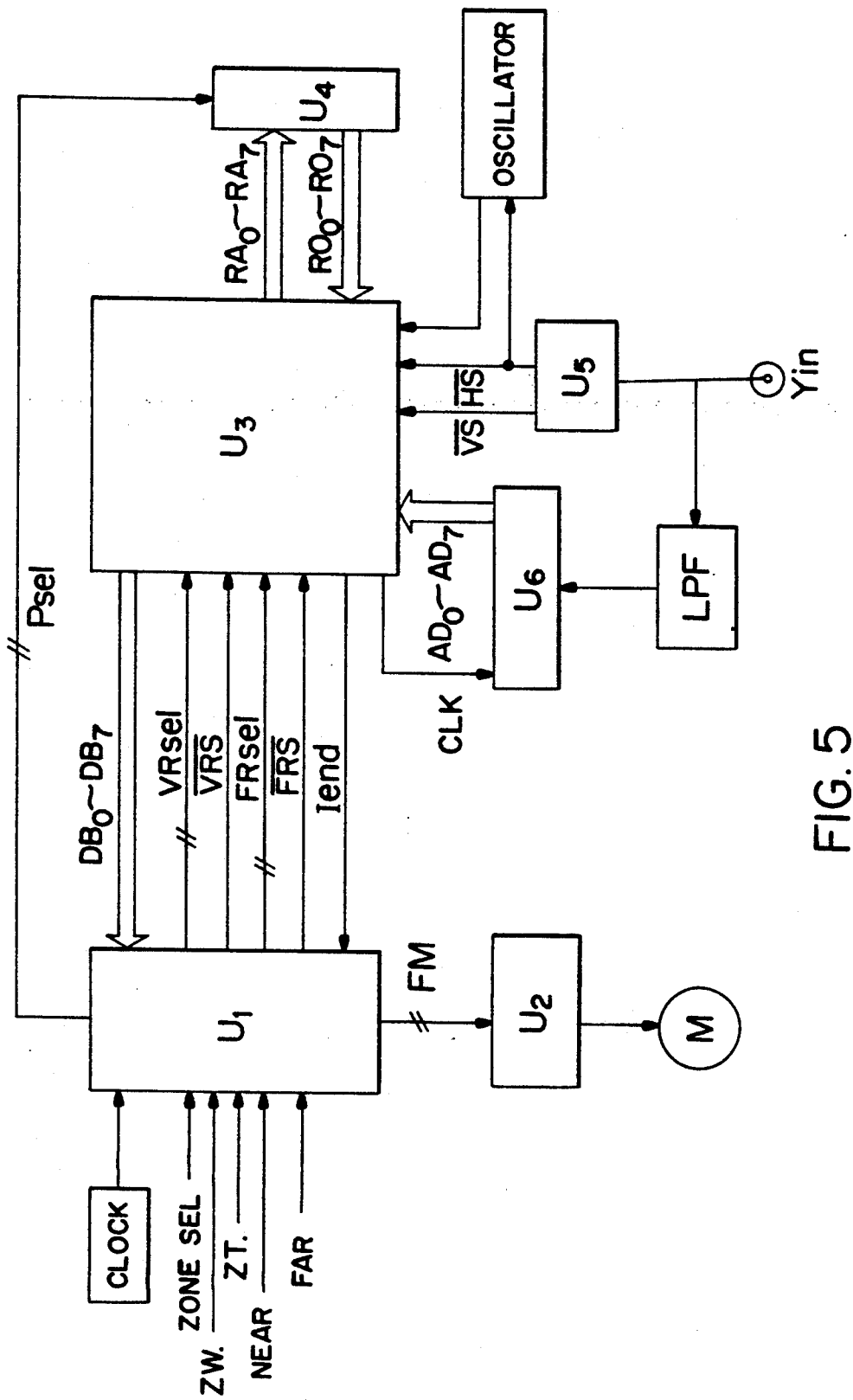
FIG. 5 shows an example of circuits according to the present invention, arranged using semiconductor chips.

FIG. 5 illustrates the autofocusing circuit of the present invention embodied utilizing the semiconductor chips which are commercially available now. An U1 in FIG. 5 is a microprocessor chip of Intel product No. 8752, serving as a microcomputer. An u2 is a semiconductor chip for motor control which is a Japanese Toshiba product No. TA 72889, and is controlled by motor control signals FM1, FM2 from U1. An U3 is a EPLD-(Erasable Programmable Logic Device) chip, a ALTERA company's product No. EPM 5128 JC-2. The U3 includes a digital filter portion (U3-1) and a digital integrator portion (U3-2) as shown in FIG. 3, and a focus range controller and a clock generator portion (U3-3) all together. An U4 is a ROM, Hyundai Electronics Co., Ltd product No. 27C512. An U5 is a video synchronizing signal separator, a semiconductor chip of Semiconductor Corporation product No. LM 1881. It has a function of generating the synchronizing signals. An U6 is an A/D converter chip, Samsung Electronics Co., Ltd product No. KSV 3208. It has a function of converting an analog video signals into a digital signals. An LPF is a low-pass filter which allows the low frequencies to pass, and its upper cutoff frequency is approximately 3 MHz. An oscillator oscillates at a frequency of 8 MHz for generating the control clock. "M" is a motor for driving the focusing lens. A CLOCK is an oscillator for providing clocks to the U1, and can be omitted when the clock of the oscillator can be utilized.

The Yin is a video signal input. The high frequency components of the video signals are blocked by the LPF, and the signals with the frequencies up to 3 MHz are passed to the U6. The video signals are also supplied to the U5, in which horizontal synchronizing signal HS and vertical synchronizing signal VS are generated to be supplied to the U3.

The U6 converts the video signals passed by the LPF into 8-bit parallel digital signals according to the CLK from U3, and supplies them to the U3 over data lines AD0-AD7.

The U3 has the digital filter portion and converts the 8-bit parallel digital signals into 8-bit digital differential signal. The digital differential signal is applied to the address lines RA0-RA7 of the U4, and the data stored in the U4 corresponding to the address is the digital weighted signal, which is then transferred to the digital integrator portion of the U3 over data lines RD0-RD7. In the digital integrator, the bytes for one field or one frame are added cumulatively, the integration completion signal Iend is forwarded to the U1 on completion of integration. The U1 reads the focusing value placed in the register of the selector of the digital integrator over data bus DB0-DB7 using 2-wire signal line FRsel(Register select signal) and signal line FRS(Strobe signal). Since the U1 set the focus range in the comparator via lines VRS(Strobe signal) and VRsel(Register select signal), if a manual signal ZONE SEL is not activated, the value read via data bus is the focusing value representing the contrast of the focus range. Then the U1 determines the speed and rotation of the focusing lens motor considering a zooming signal ZW(ZOOM WIDE) and ZT(ZOOM TELE) and the focusing lens location signals FAR(infinity) and NEAR(near point), and instructs to the U2 via signal lines FM for driving the motor M.

The 2 slashes marked on signal lines means 2-wire signal line. The signal Psel is a pattern select signal for selecting the nonlinear weight value curve.

The U1 goes on reading the focusing value in accordance with the program and adjusting the focus. Referring to the relevant flowcharts, the processes executed by the U1 will be explained below.

Figure 6:
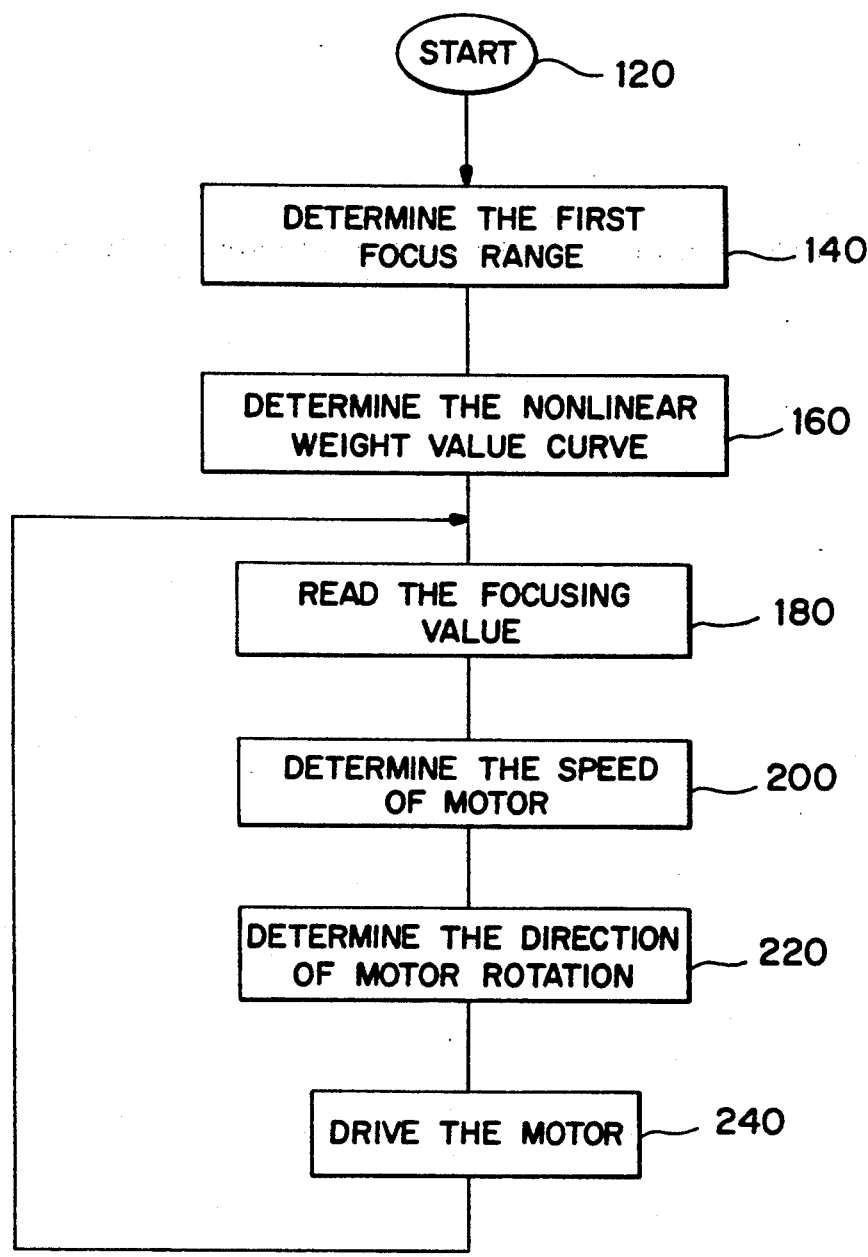
FIG. 6 is a flowchart for explaining briefly control functions carried out by the microcomputer in the autofocusing circuits of the present invention

FIG. 6 shows the example of the processes carried out by the U1. The system is initialized before the step START. The initialization includes settings of a plurality of focus ranges, a plurality of nonlinear weight value curves, the grades of focusing value, the kinds of fuzzy variables and values for their various membership, the rules of fuzzy control, and the rules for the determination of the direction of motor rotation.

The system starts at step 120. Among some focus ranges the first focus range of medium size is determined (step 140). One of the nonlinear weight value curves is selected (step 160). When the signal Iend is received, the focusing value is read(step 180). The optimal motor speed is determined by manipulating according to the fuzzy variables and the rule of fuzzy control (step 200). The direction of motor rotation is determined considering the information on the lens motor location (step 220). The motor is then driven at step 240. The steps 180 through 240 are repeated until the focus is adjusted.

Figure 7:
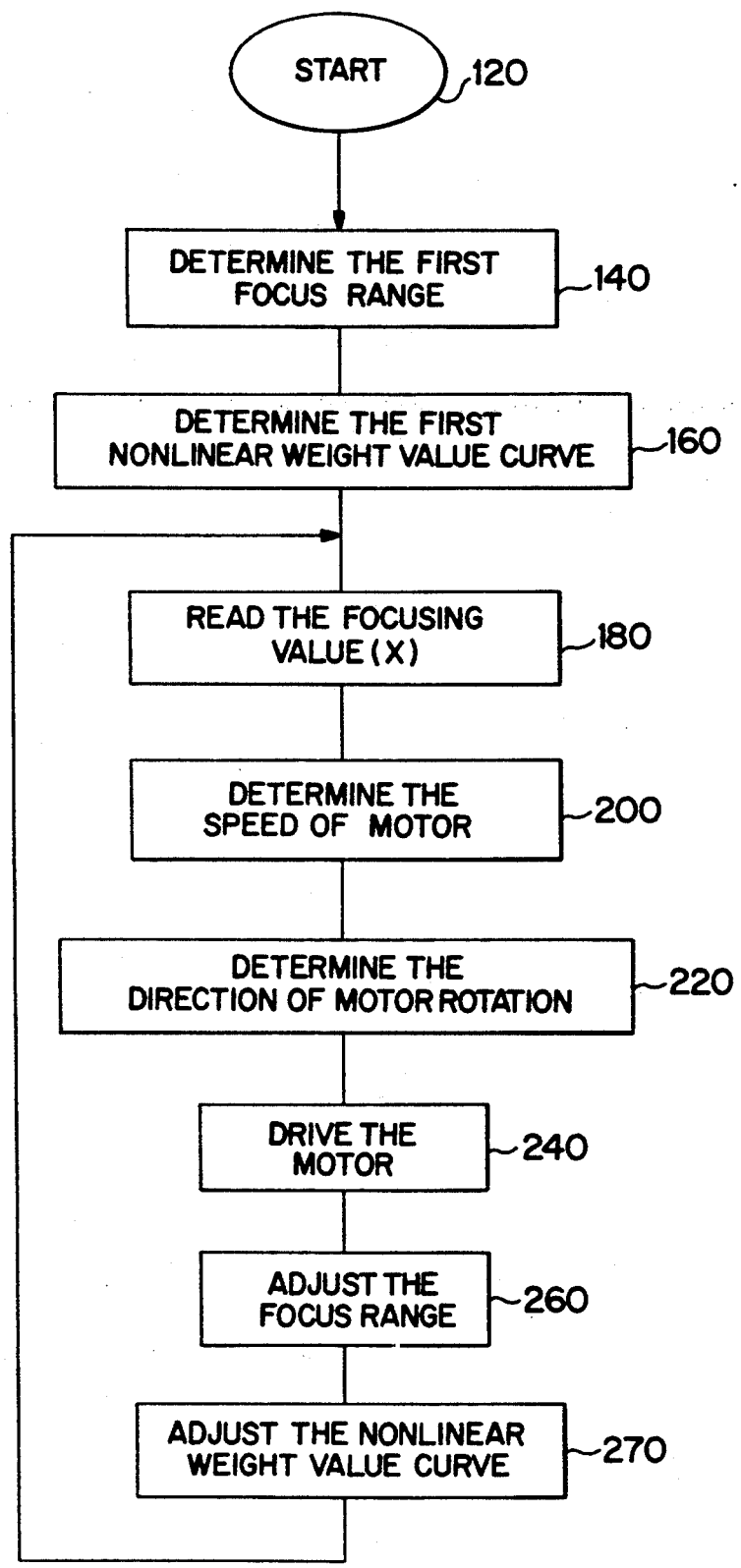
FIG. 7 is a flow chart for explaining briefly other control functions carried out by the microcomputer in the autofocusing circuits.

FIG. 7 shows some additional functions which are added to the functions as shown in FIG. 6, i.e., "adjust the focus range" (step 260) and "adjust the nonlinear weight value curve" (step 270) are incorporated. These steps are included to adjust the focus range to the appropriate area and the nonlinear weight value curve to the appropriate shape so that the fastest and the most accurate focusing can be accomplished according to the kinds of objects and the illumination conditions.

Now referring to the FIGS. 8, 9, 10 and 11, the detailed functions will be explained.

Figure 8:
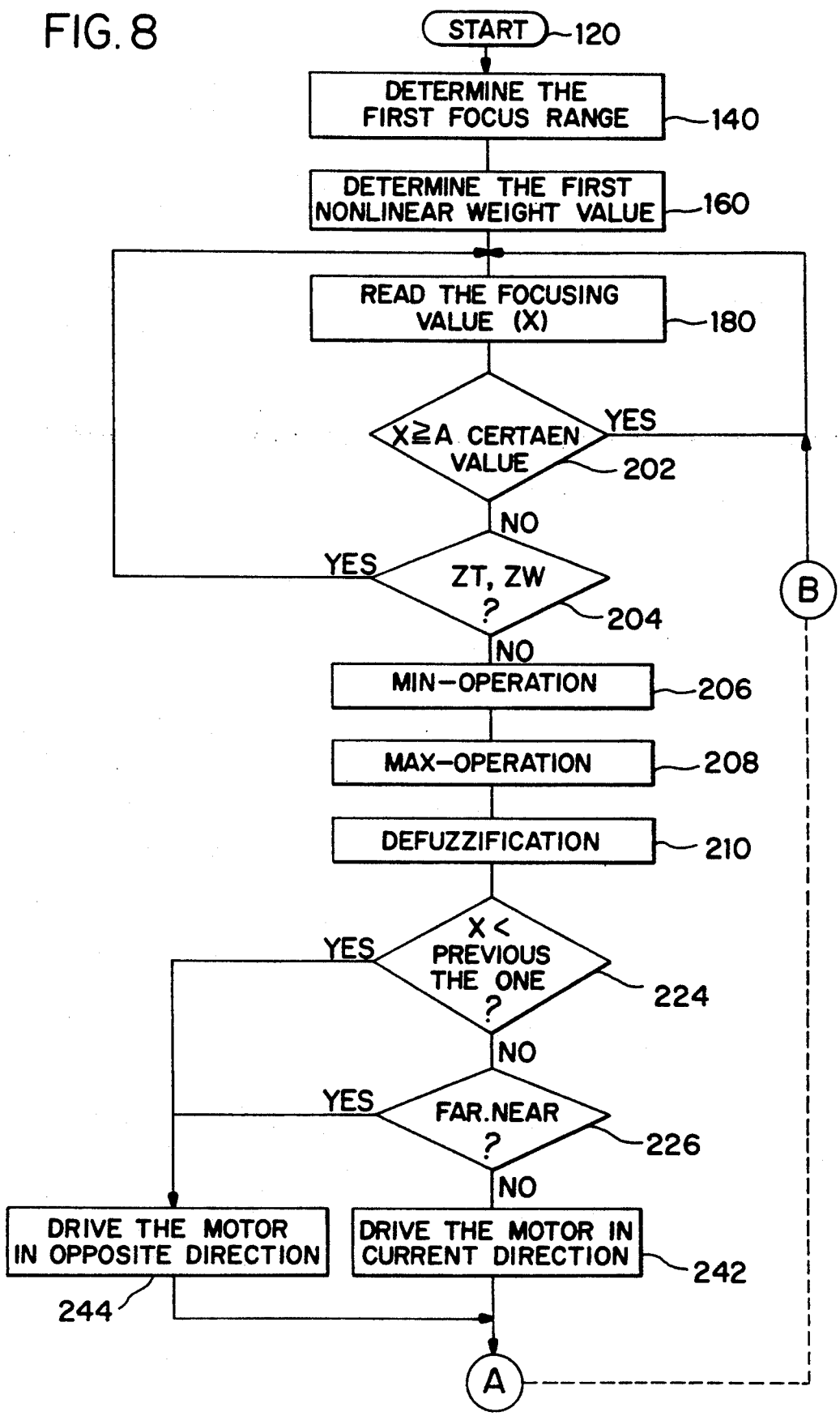
FIG. 8 is a flowchart for explaining in detail the control functions carried out by the microcomputer in the autofocusing circuits of the present invention.

As shown in FIG. 8, the steps START through "read the focusing value" (step 180) are same as shown in FIGS. 6 and 7.

An optimal motor speed is determined by the step 202 through 210 in FIG. 8. The U1 determines at step 202 whether the focusing value is not less than a certain value or not. The certain value is defined previously by determining the focusing value in statistical ways when in focus. When the focusing value is not less than the certain value, i,e, the answer is affirmative, the process returns to step 180.

When the focusing value is less than the certain value, go to step 204, where the status of zooming is checked. If in zoom-in or zoom-out, then return to step 180, otherwise go to step 206.

The fuzzy variables are divided into 4 kinds according to the magnitude of focusing value and into 4 kinds according to the motor speed. The fuzzy variables have continuous triangular shapes as shown in an example of FIG. 10. The fuzzy variables for focus states are 4 kinds, out-of-focus state(BLUR), the state in which the focusing value starts to change (DYN), the state in which the maximum focusing value is nearly approached (FOC), in-focus state (SET).

The fuzzy variables for motor speed are 4 kinds according to the motor speed, FAST, LOW, MID and STOP.

The shapes of fuzzy variables can be a trapezoid or a bell, which should be selected at the time of system initialization.

There are four fuzzy control rules:

Rule 1: if the focus state is BLUR, the motor speed is defined as FAST.

Rule 2: if the focus state is DYN, the motor speed is defined as MID.

Rule 3: if the focus state is FOC, the motor speed is defined as SLOW.

Rule 4: if the focus state is SET, the motor speed is defined as STOP.

The U1 determines the motor speed by carrying out the MIN-Operation,, Max-Operation and Defuzzification according to such fuzzy variables and fuzzy control rules.

The fuzzy reasoning carried out according to the fuzzy variables and the control rules has been discussed in many articles and books, for example, in "Fuzzy Set Theory and Its Application" by H. J. Zimmermann published by Klawer-Nighoff Publishing, 1985.

Then the determination of the direction of motor rotation and the motor driving are carried out at steps 224 through 244.

At step 224, if the focusing value decreases below the previous value, the direction of motor rotation is the opposite of the current direction. If the focusing value increases, then the location of focusing lens is checked. If in FAR state or NEAR state, the motor is driven in the opposite direction, and otherwise in the current direction. The motor speed at this time is the value obtained at step 210.

In case the focus range is fixed or the ZONE is selected manually or the nonlinear weight value curve is fixed, then return directly to the step 180. If in the state of automatically adjusting the focus range, the steps 262 through 268 are executed.

At the step 262, it is checked whether the state is the one of automatic adjusting of focus range or not. If the answer is NO, the steps 263 through 269 are bypassed in order to go directly to step 272. If the answer is YES, the focus range is extended (step 263). Next the focusing value resulting from extension is read (step 264). The ratio of the areas of focus range after extension and before extension RFA and the ratio RFV of focusing values before extension and after extension RFV are obtained (step 265). The focus range is reduced to original one (step 266). The RFV and RFA are compared with each other (step 267). If RFV is less than RFA, then the focus range is reduced again (step 268). If RFV is equal to or bigger than RFA, then the focus range is extended (step 269). The reason for doing this is because the focus range of larger area may be less influenced by the noises.

Then step 272 is executed for adjusting the nonlinear weight value curve. At step 272, the magnitude of the focusing value is checked to see which one of some grades it is pertain to. If it is in the same grade as current one, the selected weight value curve being used currently is not changed. If not so, the shape of the weight value curve is changed in the way that the weight value curve of larger grade is used in case of larger grade and the weight value curve of smaller grade is used in case of smaller grade (step 274). The change of shape of the weight value curve means a change of a reference value by which the digital differential signals are multiplied to neglect them or to emphasize them. If the step (274) is completed, then go to step 180 and the previous steps described above are repeated continuously.

Figure 9:
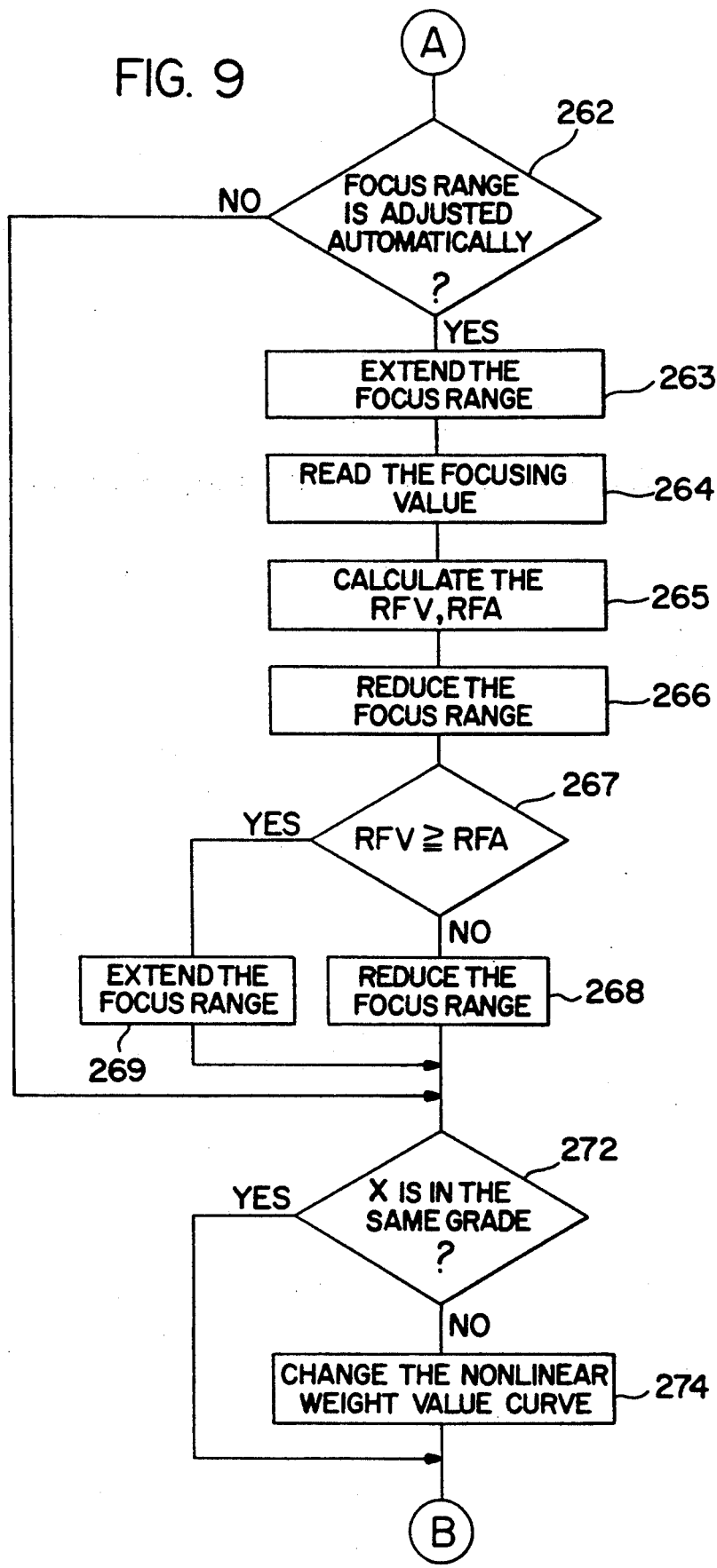
FIG. 9 is a flowchart showing the additional functions inserted between A and B of FIG. 8.

As shown in FIG. 8, the dotted line between node A and B means that either the node A and the node B in FIG. 9 is connected to the corresponding nodes in FIG. 8 or the node A and B is connected directly.

The method and circuit of the present invention as described above not only overcomes the disadvantages of traditional passive method which utilizes the contrast signals but also has advantages of accomplishing fast and correct focusing and reducing the camera weight.

The invention being thus described, it will be obvious that the same may be varied in many ways. Such variations are not to be regarded as a departure from the spirit and scope of the invention, and all such modifications as would be obvious to one skilled in the art are intended to be included on the scope of the following claims.

What is claimed is:

1. A method for autofocusing a video camera, which extracts a video signals obtained within a predetermined focus range in a image pick-up element of the video camera, converts said video signal into a digital signal, integrates said digital signal to produce a focusing value, and moves a focusing lens in a direction of increasing contrast so that an optimal focus may be obtained by use of said focusing value, said method comprising the steps of:

(a) defining a focus range for which said video signal is to be extracted, (b) generating a control clock pulse having higher frequencies than that of said video signal during the periods of arrivals of the horizontal and vertical synchronizing signals corresponding to said focus range, (c) sampling said video signals obtained in said image pick-up element according to said control clock pulses and converting the sampled signal into a digital signal, (d) generating a digital differential signal which represents the difference between the current value of said digital signal and that of one control clock pulse earlier one, (e) generating a digital weighted signal by transforming said digital differential signal by means of a nonlinear weight value curve, (f) integrating said digital weighted signals for at least one field or frame, thereby obtaining said focusing value, (g) determining a speed and direction of rotation of a focusing lens motor based on said focusing value to move the focusing lens toward the location where the approximately maximum focusing value is obtained, (h) adjusting said focus range defined in step (a), and (i) adjusting said nonlinear weight value curve of step (e), by transforming the nonlinear weight value curve if said focusing value does not belong to current grade of the focusing value, and maintaining the nonlinear weight value curve if said focusing value pertains to current grade of the focusing value.

2. The method according to the claim 1, wherein said nonlinear weight curve is transformed according to the focusing value and a value of a magnitude of said video signal which currently exist.

3. The method according to the claim 1, wherein said nonlinear weight curve is transformed according to a brightness signal from an automatic exposure controller.

4. An autofocusing device including a control circuit for a video camera, which extracts a video signal within a predetermined focus range in a image pick-up element of said video camera, converts said video signal into a digital signal, integrates said digital signal to produce a focusing value, and moves a focusing lens in a direction of increasing contrast so that an optical focus may be obtained by use of said focusing value, said control circuit comprises:

means for providing a control clock pulse to the circuits which processes digital signals, which includes a horizontal and vertical synchronizing signal generator, a clock signal generator, and a focus range controller and generates a control clock pulse having predetermined period in synchronization with a vertical and horizontal synchronizing signal according to a focus range signal which indicates the beginning and end of predetermined focus range, an A/D converter connected to a low-pass filter which filters said video signal converting said video signal passed by said low-pass filter into a parallel digital signal of a plurality of bits according to said control clock pulses, a digital filter connected to said A/D converter, generating a digital differential signal which represents differences between each said parallel digital signals which arrive at each control clock period from said A/D converter, an weighing circuit connected to said digital filter, generating a digital weighted signal by multiplying an weight value to each of said digital differential signal, which weight value is predetermined pursuant to the magnitude of said digital differential signal, a digital integrator connected to said weighting circuit, producing said focusing value by adding said digital weighted signals cumulatively for at least one field or frame, a microcomputer connected to said digital integrator via data bus to receive said focusing value, controlling the overall control circuit to autofocus by carrying out the predetermined operations based on said focusing value, and a motor control circuit connected between said microcomputer and a focusing lens motor, controlling said focusing lens motor according to a motor control signals from said microcomputer, wherein said weighing circuit includes a ROM with a address lines of said ROM being connected to a data lines of digital filter on which the digital differential signal is outputted and the data lines of said ROM being connected to said digital integrator.

5. The autofocusing device according to claim 4, wherein data of said weight values stored in said ROM are arranged in such a way that the weight values are made to equal to zero if the magnitude of digital differential signal is below a predetermined small magnitude or above a predetermined large magnitude and that the weight values become bigger if the magnitude of digital differential signal goes big in the intermediate range.

6. The autofocusing device according to claim 5, wherein said weight value is fixed at a certain value for the magnitude which is above said predetermined large magnitude.

7. The autofocusing device according to claim 5, wherein a PLA is used instead of said ROM.

* * * * *